No. 777,485. PATENTED DEC. 13, 1904.
H. PAULING.
PROCESS OF HEATING AIR.
APPLICATION FILED AUG. 12, 1902.
NO MODEL.
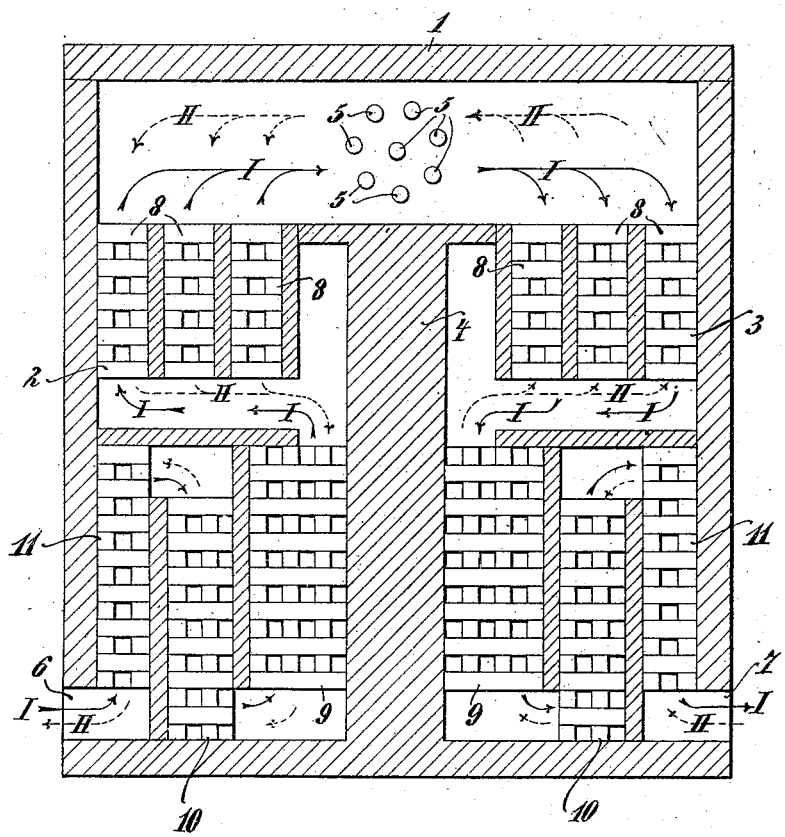
Witnesses:
Inventor
Harry Pauling
by Marion Marion
Attorneys No. 777,485.

Patented December 13, 1904.

UNITED STATES PATENT OFFICE.

HARRY PAULING, OF BRANDAU, AUSTRIA-HUNGARY.

PROCESS OF HEATING AIR.

SPECIFICATION forming part of Letters Patent No. 777,485, dated December 13, 1904.

Application filed August 12, 1902. Serial No. 119,391. (No model.)

*To all whom it may concern:*

Be it known that I, HARRY PAULING, director of mines, a citizen of the Kingdom of Saxony, and a resident of Brandau, Bohemia, Austria-Hungary, (whose post-office address is house No. 200,) have invented certain new and useful Improvements in Processes of Heating Air, Gases, and the Like, of which the following is a specification.

My invention relates to a process for heating gases or gas mixtures, such as air, to a high temperature with a view to dissociate or combine them and to obtain in this way other useful products, such as oxids and the like. My process relates in particular to forming oxids of nitrogen.

The process consists in conducting the gases to be heated alternately from both sides through a chamber provided with a suitable heat-generator, said chamber being situated between two heat-regenerators, the heat imparted to the gases first by the heat-generator alone and then by the latter and one of the heat-regenerators, and so on, being after the reaction almost in its entirety given off to the heat-regenerator which succeeds the heating-chamber.

By this process an exceptionally high temperature equal to that of the heat-generator is produced after a short period of working throughout the heating-chamber inclosing the heat-generator. Fluctuations of temperature in this chamber, particularly in proximity to the heat-generator, are entirely avoided, and the loss of heat is so small that when the temperature in the chamber has been brought to that of the heat-generator the temperature will remain almost constant for a considerable length of time, even if the supply of heat from the generator is discontinued.

Any source of heat or heat-generator can be used, the best adapted being, however, the electric arc produced by means of carbon electrodes, the combustion of the carbon electrodes being accelerated by the great accumulation of heat in the heating-chamber and the heat resulting from this assisting in the heating of the gases. In this case the quantity of gases alternately supplied is preferably proportionate to the quantity of carbon evaporated.

Primarily a cold current of atmospheric air or other suitable substance is introduced from outside and after being heated by the arc is caused to pass into a heat-regenerator arranged behind the furnace. This heat-regenerator withdraws from the air or gas the heat derived from the electric arc. If thereupon the direction of the air-current is reversed, the air which reaches the electric arc will be already powerfully heated, so that the combustion of the carbon electrodes is considerably accelerated, and the heat resulting therefrom assists in increasing the production of heat at approximately the temperature of the electric arc. The increased quantity of heat is then given off in the second heat-regenerator and serves when the direction of the air-current is again reversed to increase the temperature of the fresh current of air or gas. The reversal is continued until the temperature of those parts of the heat-regenerators nearest the furnace is equal or approximately equal to that of the heat-generator. When thereupon the current has been interrupted and the electrodes withdrawn, so that they no longer extend into the furnace, any suitable gas or air or the like can be driven in alternately-reversed directions through the furnace for any reaction until the requisite high temperature no longer exists, and when the temperature of the furnace or heating-chamber has been increased again by the method described the process can be repeated indefinitely. In particular the oxygen and the nitrogen of the air may be made to combine, forming under the conditions stated nitrogen dioxid. The resulting nitrogen dioxid may be converted into nitric acid in any suitable manner.

In a copending application, Serial No. 119,392, filed August 12, 1902, I have described a specific method of making nitric acid from nitrogen dioxid.

Any suitable apparatus can of course be used for performing this process. One form of apparatus for the purpose is diagrammatically illustrated in cross-section in the annexed drawing. In this apparatus there is arranged at each end of an electric furnace a heat-regenerator with supply and exhaust conduit, and a current of air or gas passing through the said furnace is caused before entering the furnace and after leaving the latter to pass through one of the said heat-regenerators. It is also important that each of the regenerators is divided into several compartments and that the cross-section of the latter decreases in correspondence with the distance from the furnace and in proportion to the progressive cooling and the decreasing velocity of the gases or air coming from the furnace. This arrangement possesses, among others, the advantage that when the gas or air current is conducted through the apparatus the heat of the said current is entirely absorbed by the heat-regenerator, so that no loss of heat, or only a very slight loss, takes place.

The drawing represents a section of an apparatus by which the process may be carried out.

The apparatus illustrated is made of the best fireproof material, adapted to withstand a temperature of up to 2,500°, and comprises an electric furnace 1 contiguous to the upper parts of two heat-regenerators 2 and 3, which latter are separated from each other by a thick bridge 4. The source of heat is formed by a suitable number of carbon electrodes 5, which extend transversely into the furnace; but any other arrangement or means can of course be used. Conduits 6 and 7 lead into the lower parts of the respective heat-regenerators, through which conduits gas, air, or the like alternately enters and passes out. Each heat-regenerator is preferably divided into a suitable number of compartments 8, 9, 10, and 11, the effective cross-section of which decreases toward the conduits 6 and 7. Each of these compartments may be provided with a trellis of fireproof material to absorb heat from the current of gas or air which passes through it. The drawing indicates the courses traveled by the gas or air current in the directions of the arrows I and II, respectively, from its entrance through the conduits 6 and 7 to its exit through the said conduits.

It will be understood that by passing the heated air through electric arcs I utilize the heat from that portion of the air mixture of which only a small portion of the nitrogen has been converted into dioxid of nitrogen.

Having now particularly described and ascertained the nature of my said invention and in what manner the same is to be performed, I declare that what I claim is—

The process of heating air and other gases and forming nitrogen dioxid, which consists in passing air or a mixture containing air through a heat-regenerator, a suitable source of heat and a second regenerator, thereby imparting to the air heat derived from a similar air mixture previously subjected to the source of heat, then passing air in a direction reversed to that of the previously-treated air through the said source of heat and regenerators, maintaining a temperature within said regenerators and at the source of heat approximately equal to or in excess of 2,200° centigrade.

In testimony whereof I affix my signature in presence of two witnesses.

HARRY PAULING.

Witnesses:
 HENRY HASPER,
 WOLDEMAR HAUPT.